March 7, 1944.  E. LINDERME, SR  2,343,680
TUBE DRAWING APPARATUS
Filed April 22, 1942  2 Sheets-Sheet 1

INVENTOR.
EMIL LINDERME SR.
BY *Fay, Macklin, Golrick Williams, Chilton and Isler*
ATTORNEYS March 7, 1944.  E. LINDERME, SR  2,343,680

TUBE DRAWING APPARATUS

Filed April 22, 1942  2 Sheets-Sheet 2

INVENTOR.
EMIL LINDERME, SR.
BY Fay, Macklin, Gohrick
Williams, Chilton and Isler
ATTORNEYS.

Patented Mar. 7, 1944

2,343,680

UNITED STATES PATENT OFFICE 2,343,680

TUBE DRAWING APPARATUS

Emil Linderme, Sr., Shaker Heights, Ohio, assignor to The Linderme Tube Company, Euclid, Ohio, a corporation of Ohio Application April 22, 1942, Serial No. 440,013

7 Claims. (Cl. 205—7)

This invention relates to the art of drawing tubes by a cold process wherein tubes are drawn or reshaped by a mandrel and suitable dies, the mandrel preventing the tubes from being crushed or collapsed while being elongated by dies between which the tubes are drawn.

In my United States Patent No. 1,541,424, there is disclosed a tube drawing machine in which provision has been made for loosening the tube from the mandrel as the mandrel and its tube emerge from the die, so as to permit the mandrel to be withdrawn from the drawn tube. The tube loosening devices consist, in that case, of a pair of longitudinally spaced chuck or clutch heads supporting a plurality of radially adjustable rolls adapted to engage the tube and loosen the tube relatively to the mandrel, one of the chuck or clutch heads being bodily revolved in a direction opposite to the direction of rotation of the other chuck head to insure release of the tube from its mandrel. The rolls have a kneading action on the tube and set up sufficient vibration to cause the tube to become loose on its mandrel, so that after the tube has been fully drawn and removed from the drawing bench to the work disassembling bench, the mandrel may be withdrawn from the tube.

Due to the fact that the rollers of the tube loosening devices in that case are disposed with their axes parallel or substantially parallel with the axes of the tube and mandrel, a rifling or fluting action is imposed by the rollers on the tube as it is drawn past the rollers, and which manifests itself in the form of scratches or similar imperfections on the surface of the finished tubing.

I have discovered, however, that I can minimize or eliminate this rifling or fluting action and produce a drawn tube virtually free from surface defects or imperfections by the simple expedient of mounting the rollers on the chuck head in such a manner that their axes are disposed at an angle other than 90 degrees to a plane which is normal to the axes of the tube and mandrel, i. e., a plane normal to the direction of movement of the tube and mandrel. Where the chuck head lies in such a plane, the rollers will, of course, have their axes at an angle other than 90 degrees to the chuck head. Expressed in another way, the rollers are so mounted that their axes, if extended, will intersect at an angle less than 90 degrees a vertical plane in which the axes of the mandrel and tube lie.

The invention will be better understood by reference to the accompanying drawings, forming a part of this specification, and in which like numerals are employed to designate like parts throughout the same.

Figure 1:
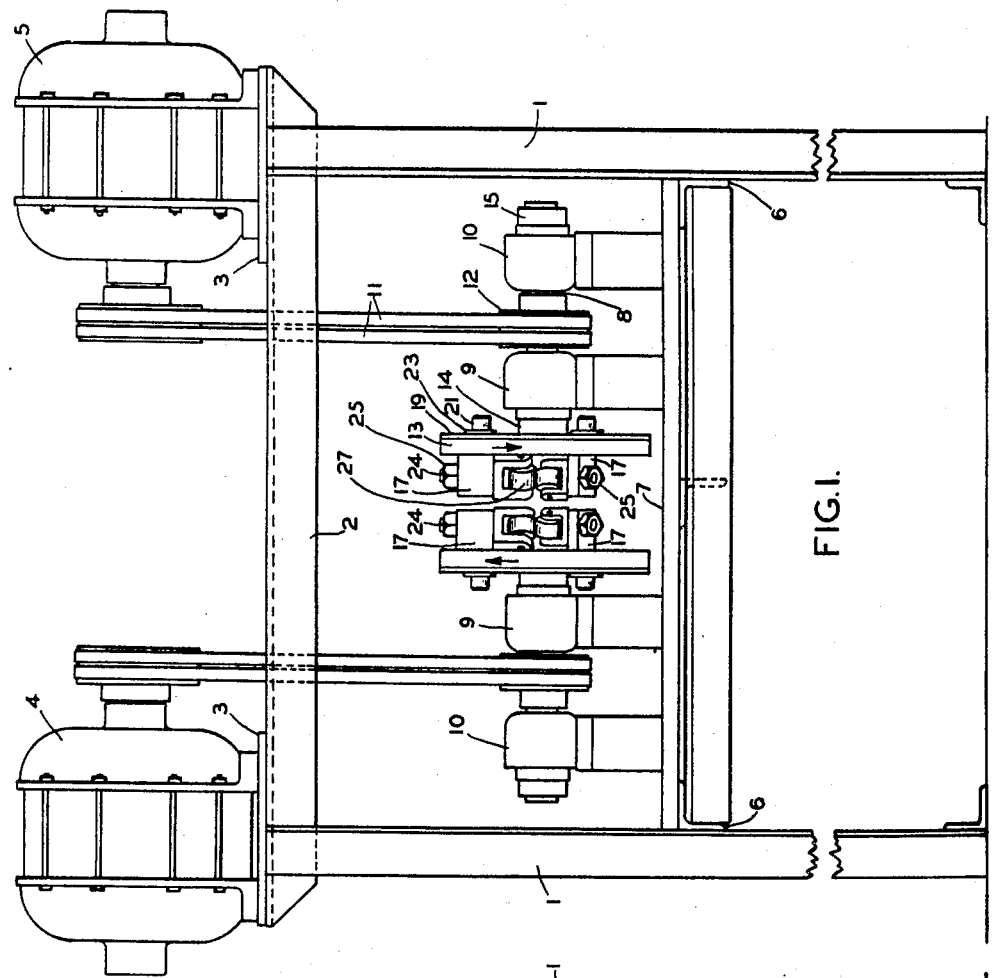
Fig. 1 is a side elevation showing the tube loosening device of the present invention.

The devices are mounted on a framework, consisting of angle uprights 1, connected at the top by means of angles 2, which support plates or shelves 3, upon which are mounted motors 4 and 5 for driving the chuck heads to be presently described.

Interconnecting the front and rear uprights at points intermediate the ends of the latter are angles 6, which support a shelf or plate 7 upon which the tube loosening devices proper are mounted.

Each of the tube loosening devices comprises a hollow shaft 8 which is rotatably journalled in a pair of spaced pillow block bearings 9 and 10 rigidly supported on the plate 7, the shaft being rotated by means of the motor 5 through the intermediary of V-belts 11 and a sheave 12 which is keyed to the shaft 8 at a point between the bearings 9 and 10.

Threadedly secured to one end of the shaft 8 is a chuck head 13 provided with a hub portion 14 which abuts the bearing 9, and which cooperates with a nut 15 secured to the other end of the shaft and abutting the bearing 10, to restrain the shaft against axial movement relatively to the bearings 9 and 10.

The chuck head 13 is provided with a plurality of circumferentially-spaced radially extending slots or openings 16, in each of which a block 17 is mounted, the block being somewhat shorter than the length of the slot 16 so that it is radially adjustable to any position within the limits of the slot. The block is maintained in radially adjusted position by means of a set screw 18 which engages the radially outward surface of the block.

Simultaneous radial adjustment of all of the blocks is effected by means of a rotatable disc 19 which abuts the rear face of the chuck head and is provided at points spaced inwardly of its periphery with arcuate slots 20, corresponding in number to the number of blocks, each slot being eccentric to the center of the disc and extending for approximately 90 degrees around the disc. Each of the blocks has secured thereto a screw 21 which extends through one of the slots 20, a hardened steel washer 22 being interposed between the shank of the screw and the walls of the slot, and a steel washer 23 being interposed between the head of the screw and the rear surface of the disc 19. It will be apparent from this construction that by withdrawing the set screws 18 and loosening the screws 21, and rotating the disc 19, the blocks can be simultaneously radially adjusted to any desired position within the limits of the openings 16, the blocks being then locked in adjusted position in an obvious manner by resetting the set screws and tightening the screws 21.

The blocks 17 project forwardly from the face of the chuck head and in each of such forwardly projecting portions, a clevis bolt 24 is mounted and retained in position by means of a nut 25. The stem of each bolt has its axis extending radially of the axis of the chuck head and the furcations thereof support a pin 26 on which is journalled a steel roller 27. The bolts are rotatably adjustable in the block 17, and are so adjusted that on one chuck head, the rollers 27, in this instance, are disposed with their axes at an angle of approximately 75 degrees to a plane P—P which is normal to the axes of the tube T and mandrel M, i. e., which plane is of course normal to the direction of movement of the tube and mandrel. Since the chuck head lies in a plane parallel to the plane P—P, the rollers will, of course, have their axes at an angle of 75 degrees to said chuck head. Expressed in another manner, the rollers 27 are so mounted that their axes, if extended, will intersect at an angle of 15 degrees a vertical plane in which the axes of the mandrel and tube lie.

On the other chuck head, the rollers 27 are similarly mounted, but the rollers will be disposed at an angle of 30 degrees to the rollers on the first chuck head, since the chuck heads face each other.

The operation of the tube loosening devices may now be described as follows:

The mandrel M and tube T are drawn through a die D mounted on a transverse head H, and as they are thus drawn through the die, the thickness of the tube wall is reduced so that the metal is evenly and slowly crowded toward the rear end of the tube, thus elongating the tube and drawing it out to a desired length. In so drawing the tube while on the mandrel, the walls of the tube receive a pressure which tends to contract the granular or fiber structure of the tube walls and produce a more intimate molecular composition resulting in a strong and tenacious tube.

Figure 2:
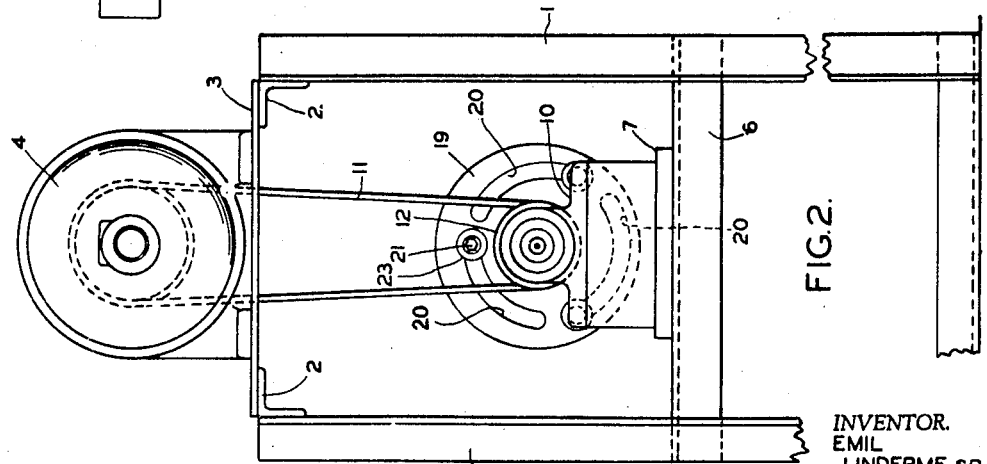
Fig. 2 is an end elevation of the tube loosening device as viewed from the left of Fig. 1.
Figure 3:
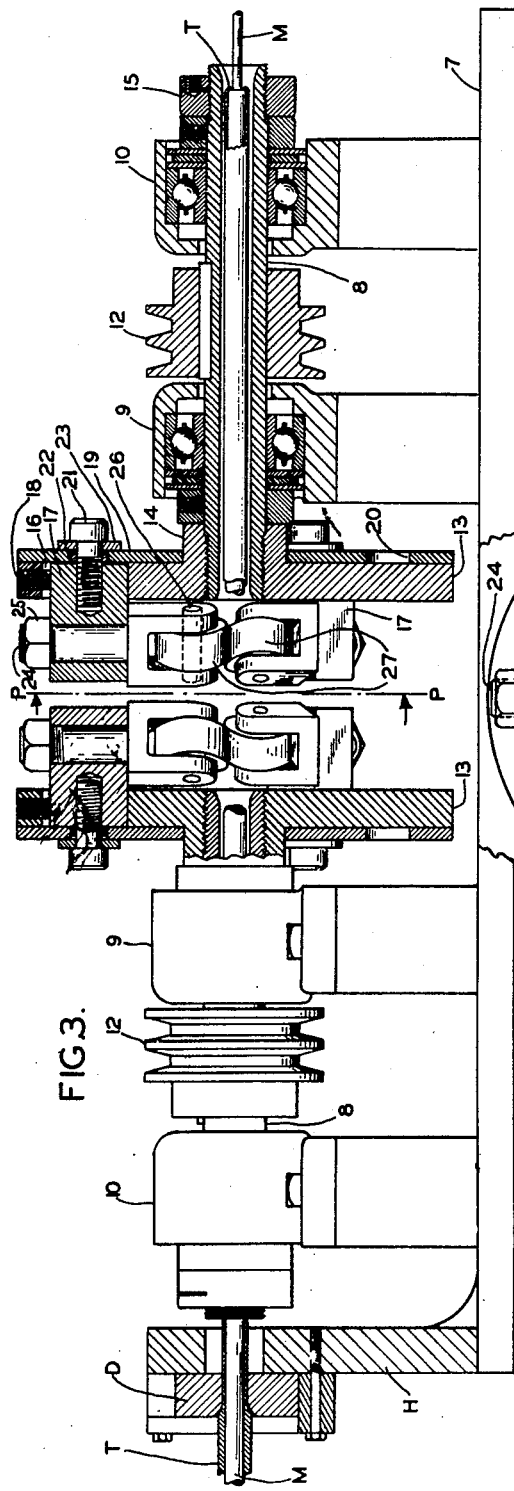
Fig. 3 is a longitudinal sectional view, showing the passage of the tube and mandrel through the die and tube loosening devices.
Figure 4:
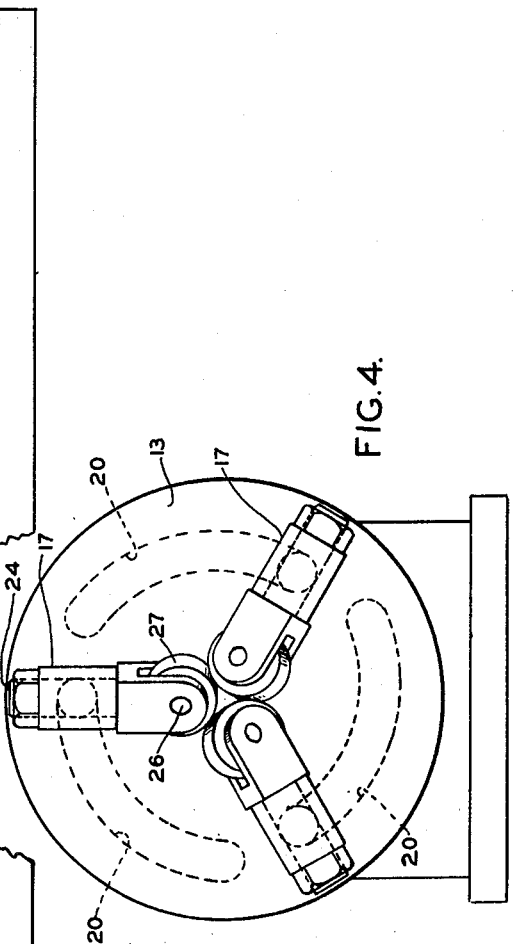
Fig. 4 is an elevational view, taken in the direction indicated by the arrows adjoining the line p—p in Fig. 3.

The drawing of the mandrel and its tube through the die D causes the tube T to be compressed about the mandrel M, making it necessary to loosen the tube so that the mandrel may be withdrawn from the drawn tube. This is accomplished by means of the tube loosening devices which have been described. As the tube and mandrel pass through these devices in the manner shown in Fig. 3, the rollers 27 exert a slight pressure on the surface of the tube, thereby decreasing the thickness of the wall to a slight extent, the first chuck head through which the tube passes being rotated in a counter-clockwise manner, as viewed in Fig. 2, while the second chuck head is rotated in an opposite direction. This causes the rollers to have a kneading action on the tube and sets up sufficient vibration to cause the tube to become loose on its mandrel, so that after the tube has been fully drawn and removed from the drawing bench to the work disassembling bench, the mandrel may be withdrawn from the tube.

Due to the fact that the rollers 27 are disposed at an angle as described, instead of as in my aforesaid prior patent, the rifling or fluting action to which reference has been made, is minimized or completely eliminated and a tube produced which is virtually free from surface defects or other imperfections.

It may be further noted that since the rollers are included in the manner described, the rotation of the chuck heads causes the rollers to exert a longitudinal pull on the tube and mandrel, and this pull may be utilized to augment the drawing pull effected by the mandrel.

The angle at which the rollers are disposed may be varied to meet different conditions, a greater angle being used with increasing speeds of the drawn tube.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. The method of loosening drawn tubing from a mandrel, which method consists in subjecting the tubing to a series of rollers passing circumferentially about the tubing under pressure to decrease the thickness of the wall and partially release the tubing from the mandrel, and then subjecting the tubing to a second rolling operation in which the rollers move in an opposite direction to the first-named rollers and completely loosen the tubing from the mandrel, the rollers being disposed with their axes at an angle of less than 90° to a plane normal to the axes of the tubing and mandrel.

2. The method which consists in moving a tube and mandrel first through a die and then through a series of rollers rotating about the moving tube, and then through a series of rollers rotating in an opposite direction about the tube, both of said sets of rollers engaging the tubing under pressure, the die and rollers acting to successively decrease the thickness of the wall and loosen the tube from the mandrel, said rollers being disposed with their axes at an angle of less than 90° to a plane normal to the axes of the tube and mandrel.

3. In a tube drawing machine, a die adapted to have a mandrel with the tube thereon drawn through said die to reduce the tube, and sets of tube loosening rolls revolved in opposite directions and adapted to loosen the tube on the mandrel after passing through said die, said rolls having their axes disposed at an angle of less than 90° to a plane normal to the axes of the tube and mandrel.

4. Means for loosening a drawn tube from a mandrel, said means comprising spaced sets of rolls through which the tube and mandrel pass, one of said sets being revolved about the tube in one direction, and the other of said sets being revolved about the tube in the opposite direction, said rolls having their axes disposed at an angle of less than 90° to a plane normal to said tube and mandrel, and means for varying the radial distance of said rolls from the axis of said tube.

5. Means for loosening a drawn tube from a mandrel, said means comprising axially spaced revoluble chuck heads, one of said heads being revoluble in a direction opposite that of the other head, said heads facing each other, and each of said heads having mounted thereon a plurality of circumferentially spaced rollers, each of which has its axis at an angle of less than 90° to the face of the chuck head.

6. Means for loosening a drawn tube from a mandrel, said means comprising axially spaced revoluble chuck heads, one of said heads being revoluble in a direction opposite that of the other head, each of said heads having mounted thereon a plurality of circumferentially spaced rollers, each of which has its axis at an angle of less than 90° to the face of the chuck head, said rollers being angularly adjustable relatively to the chuck head upon which they are mounted.

7. Means for loosening a drawn tube from a mandrel, said means comprising axially spaced revoluble chuck heads, one of said heads being revoluble in a direction opposite that of the other chuck head, each of said heads having mounted thereon a plurality of circumferentially-spaced rollers, each of which has its axis at an angle of less than 90° to the face of the chuck head, said rollers being adjustable radially of the axis of said chuck head.

EMIL LINDERME, Sr.